Feb. 12, 1924.  
J. KROHN  
DIFFERENTIAL GEARING  
Filed April 2, 1923  
1,483,606  
2 Sheets-Sheet 1
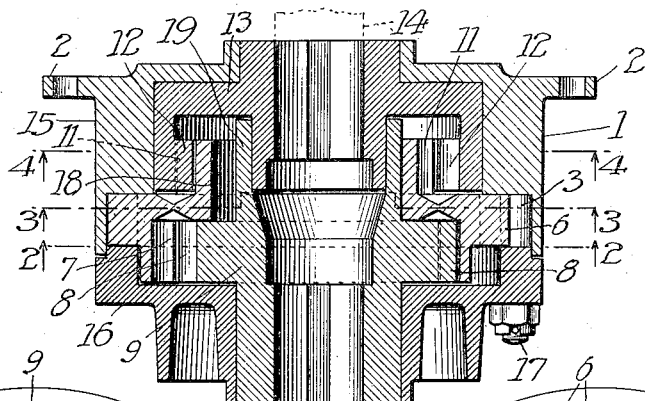
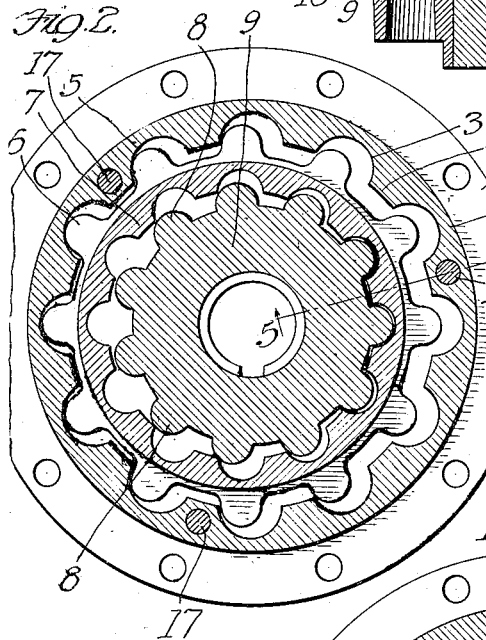
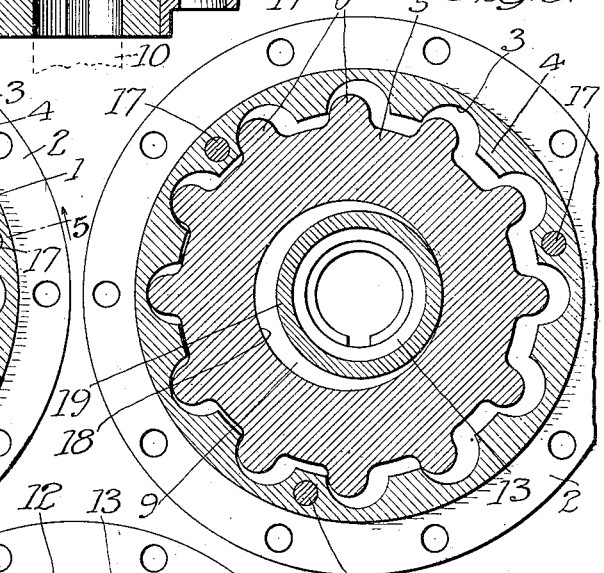
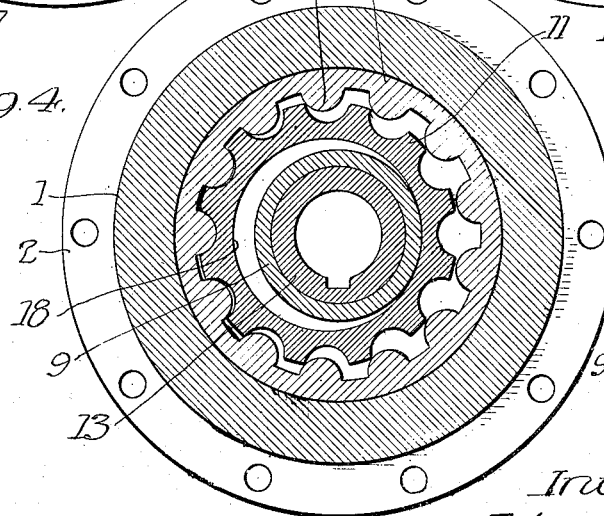
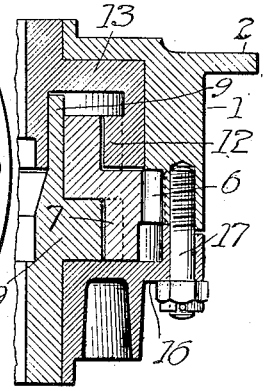
Witness  
Martin H. Olsen.
Inventor  
John Krohn  
By Rummler & Rummler  
Attys Feb. 12, 1924.

J. KROHN 1,483,606

DIFFERENTIAL GEARING

Filed April 2, 1923  2 Sheets-Sheet 2

Witness
Martin H. Olsen.

Inventor
John Krohn
By Rummler & Rummler
Attys

Patented Feb. 12, 1924.

1,483,606

UNITED STATES PATENT OFFICE.

JOHN KROHN, OF CHICAGO, ILLINOIS.

DIFFERENTIAL GEARING.

Application filed April 2, 1923. Serial No. 629,316.

*To all whom it may concern:*

Be it known that I, JOHN KROHN, a citizen of the United States of America, and a resident of Chicago, county of Cook and State of Illinois, have invented a new and useful Improvement in Differential Gearing, of which the following is a specification.

This invention relates to differential gearing of the type described in patents to John Krohn No. 1,413,855 and No. 1,413,856, dated April 25, 1922. The objects of the invention are to effect a reduction in the number of parts required in a differential gearing, to make the mechanism more compact and of increased strength and life for any given dimensions, and to improve the functioning of differential gearing particularly for such uses as in the driving mechanism of vehicles.

These objects are accomplished by the device shown in the accompanying drawings, in which—

Figure 1 is a sectional plan view of a differential gearing constructed according to this invention.

Figures 2, 3, and 4 are transverse vertical sectional views respectively taken on the lines 2—2, 3—3, and 4—4 of Figure 1.

Figure 5 is a sectional detail on line 5—5 of Figure 2.

Figure 6:
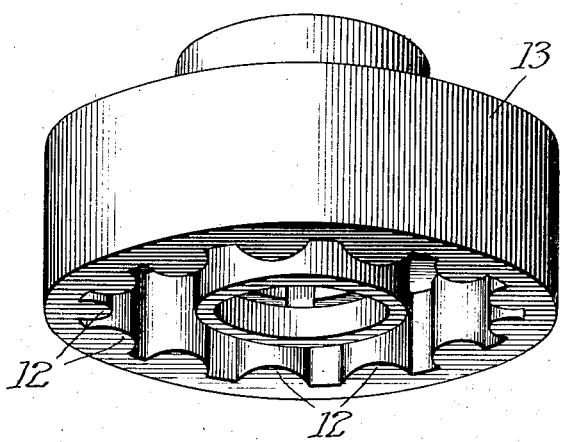
Figures 6, 7 and 8 are perspective views of the disassembled three internal parts of the differential gearing.
Figure 7:
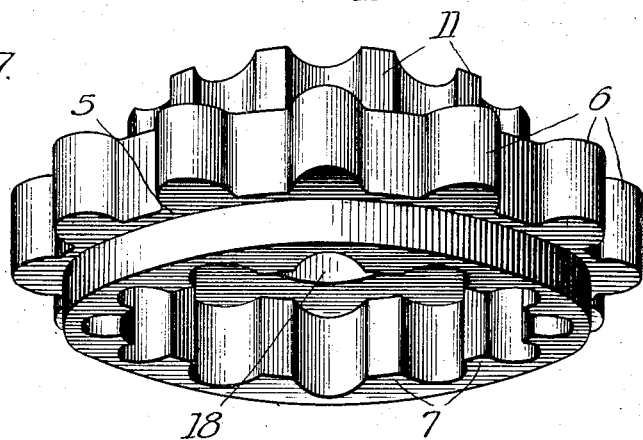
Figure 8:
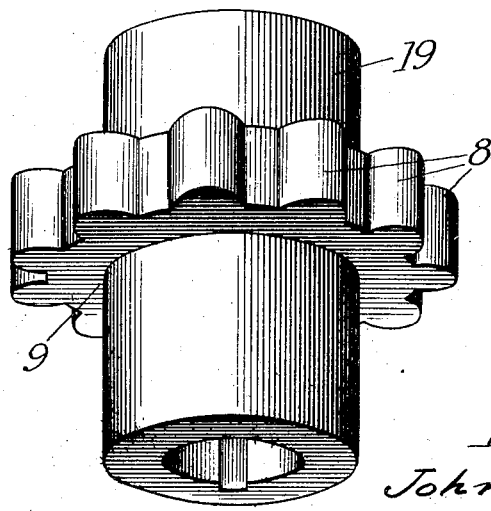

The construction as illustrated is peculiar in that only a single intermediate member or gear is employed for engagement with a gear on each of the axle sections for the purpose of driving the axle sections or transmitting motion from one to the other in an opposite direction as required of vehicle differential mechanisms. The intermediate member in driving the axle gears receives motion from a surrounding housing preferably through a toothed connection therewith, this member also being provided with two sets of teeth for respectively engaging internal and external gears on the two driven axles.

This differential gearing is also distinguishable from prior differential gearings in the method of supporting the intermediate member or gear. There is a difference of but one tooth in the number of teeth in the gears on each of the axles and the number of teeth on the intermediate member and for this reason these intermeshing teeth may be given a form and dimension whereby the teeth on the intermediate member follow the contour of the teeth on the internal and external gears on the axles. The intermediate member is, therefore, doubly supported at all points around its circumference by the mating gears, while still being free to move in a small circular path with respect to these mating gears, and thereby transmit motion from one to the other.

Referring to the drawings, the housing 1 is shown as provided with a flange 2 for receiving the usual ring gear for meshing with a pinion on the propeller shaft of a motor driven vehicle. Centrally located on the interior of the housing 1 is an annular series of recesses 3 forming teeth 4. The intermediate member 5 has a like number of teeth 6 for entering the recesses 3, but of smaller dimensions so that the intermediate member may be free to move in a circular path of small diameter, with each of its teeth always in mesh with the same recess 3 in housing 1. There is, therefore, no relative rotation between intermediate 5 and the housing 1. The intermediate 5 also has a set of internal teeth 7 for engagement with teeth 8 formed on a gear 9, fast to the axle 10. The intermediate 5 also has a set of external teeth 9 for meshing with teeth 12 of an internal gear 13, fast to axle 14. The hubs of gears 9 and 13 are telescoped thus supporting each other and adding to the strength of the device. As usual, the housing 1 is made in two parts, 15 and 16, which are secured together by the cap screws 17, but before the parts of the housing are thus secured together the device is assembled by inserting the gear 13 and the intermediate 5 in part 15 of the housing, and then engaging the gear 9 with the internal teeth 7 on the intermediate member 5.

There is a difference in the number of teeth 7 and 11 on the intermediate member and the external teeth on gear 9 and the internal teeth on gear 13, and, therefore, a rolling action may take place between the intermediate 5 and the gears 9 and 13.

As may be seen from Figs. 2 and 4, the intermediate member 5, in its circular motion when there is differential action, follows the contour of the teeth on gears 9 and 13, each of the teeth on the gears 9 and 13 at all times remaining in contact with the intermeshing teeth on the intermediate member. The intermediate member can only either rotate with the housing 1 or move with respect thereto in a small circular path, permitted by the location and shape of the teeth of the gears.

In the normal operation of the device, when no differential action is taking place, the intermediate member 5 does not have a relative movement with respect to the housing and the coacting gears, but rotates as a unit therewith, and serves to transmit the rotation of the housing to the gears 9 and 13 at the same rate. If one of the axles is retarded and the other accelerated, as would be the case if the vehicle is traveling over uneven ground or in a curved path, the intermediate member 5 executes the circular motion which it may have under such circumstances, and is guided by the recesses 3 in the housing and the teeth of the gears 9 and 13, with which it meshes. There is a difference in number of one tooth between the teeth 8 on the gear 9 and the teeth 7 on the intermediate 5. Likewise, there is a difference of one tooth between the teeth 12 on gear 13 and the teeth 11 on the intermediate 5. When the gear 9 turns the angular distance of one tooth in one direction and the gear 11 turns a distance of one tooth in the opposite direction, the intermediate member is forced to move in a circular path so all of its teeth 7 and 11 may successively enter the interdentals of the gears 9 and 13 to permit these gears to move the distance of one tooth space, as there is a difference in number of one tooth between the two intermeshing sets of teeth 7 and 8 and 11 and 12 respectively. The intermediate 5 cannot rotate with respect to housing 1, but a rotation of either of the gears 9 or 13 results in camming the intermediate 5 around a circular path as guided by the curved recesses 3 in housing 1, to execute a circular motion for each tooth space rotated through by gears 9 or 13. During such motion the gears 9 and 13 must rotate in opposite directions in view of the fact that one is an external gear and the other is an internal gear.

The above described arrangement of intermediate gear between the two gears on the axles permits easy and free differential action within the limits required of differential gears for vehicle drive mechanisms. It does, however, serve to accumulatively oppose rapid relative rotation between the driven axles when each of the wheels has some traction. Also when one wheel rises clear of the road surface, its speed cannot immediately materially increase over the speed of the other wheel and thereby subject the driving mechanism to abnormal strains when it again obtains good traction on the road. This is due to the effect of the inertia forces of the center or intermediate member in opposing differential action. For a slight differential motion between the driven axles, the intermediate member is caused to rapidly gyrate. The intermediate member is not responsive to immediate acceleration when one wheel loses its traction, and, therefore, under normal conditions of driving, the racing of one wheel will not occur, and the danger of side-slipping of the vehicle is greatly reduced because even if one brake engages in advance of the other the free wheel cannot increase in speed to a dangerous extent and interfere with the steering of the vehicle.

Compared with prior forms of differential gearing known to applicant, the present construction has fewer parts, these parts being comparatively large and durable and not involving the use of small pieces ordinarily to be found in differential gearing. It is, therefore, believed that the construction will admit of far more than the wear which will ordinarily cause the breaking down of a differential gearing. The device is not only a structural improvement in differential gearing owing to its simplicity, but will operate more perfectly according to the requirements of vehicle differential gears. It is promptly responsive to differences in resistance at the two driven wheels within the limits required for compensating for the difference in travel which is required between the two wheels. The device will not, however, permit a racking of the machine due to an excess difference in the rate of rotation of the driven wheels because of slippery road conditions or the fact that one wheel momentarily rises clear of the road surface. When there is an effort for rapid differential motion between the driven axles a resistance is encountered in the intermediate member due to its attempt to rapidly travel in a small circular path as guided by the recesses in the casing.

Although but one specific embodiment of this invention has been herein shown and described it will be understood that numerous details of the construction shown may be altered or omitted without departing from the spirit of this invention as defined by the following claims.

I claim:

1. A differential gearing of the class described comprising a casing having an annular series of teeth on its inner surface, a pair of driven gears, and an intermediate member between said gears having teeth for engaging said gears and a set of teeth for meshing with the teeth on said casing.

2. A differential gearing of the class described comprising a driven internal gear, a driven external gear, an intermediate member having teeth for engaging said internal and external gears, and a casing having teeth for engaging and rotating said intermediate member.

3. A differential gearing of the class described comprising a driven internal gear and a driven external gear, an intermediate member having teeth for engaging said internal and external gears and arranged to be eccentrically supported on said internal and external gears, a casing, said casing being provided with teeth for guiding said intermediate member in a circular path while preventing it from rotating with respect to said casing.

4. A differential gearing of the class described comprising a casing having an annular series of recesses on its inner surface, an internal gear and an external gear rotatably supported in said casing, an intermediate gear member having two sets of teeth for respectively engaging said internal and external gears, and a set of teeth for engaging the annular series of recesses in the housing, said teeth being of like number as said series of recesses, but of smaller dimensions, whereby the intermediate member is free to move in a circular path within the housing but cannot rotate relatively to the housing.

5. A differential gear of the class described comprising a casing, driven internal and external gears journaled in said casing and having extended interfitting hubs, an intermediate gear eccentrically supported between said driven gears, and having a connection with said casing permitting the intermediate gear to be driven thereby but still to move freely therein in a small circular path.

6. A differential gear of the class described comprising a casing, driven internal and external gears journaled in said casing, an intermediate gear supported on the teeth of said driven gears whereby the intermediate member is free to gyrate within said casing while maintaining contact with the teeth of the driven gears, and a driving connection between said casing and said intermediate gear.

7. A differential gearing comprising a casing, driven internal and external gears journaled in said casing, an intermediate member having external and internal sets of teeth for respectively meshing with said driven internal and external gears, said driven internal and external gears having teeth differing in number by one from the number of coacting teeth in the intermediate member, said casing having a driving connection with said intermediate member.

Signed at Chicago this 23rd day of February, 1923.

JOHN KROHN.